US011871203B2

(12) United States Patent
Bernardini et al.

(10) Patent No.: US 11,871,203 B2
(45) Date of Patent: Jan. 9, 2024

(54) METHOD FOR THE NON-LINEAR CONTROL OF AN INPUT SIGNAL FOR A LOUDSPEAKER

(71) Applicants: Elettromedia s.r.l., Potenza Picena (IT); Politecnico di Milano, Milan (IT)

(72) Inventors: Alberto Bernardini, Saraceno (IT); Lucio Bianchi, Sant'Angelo in Pontano (IT); Pietro Pantaleone, Potenza Picena (IT); Augusto Sarti, Seregno (IT)

(73) Assignee: ELETTROMEDIA S.P.A., Potenza Picena (IT)

( * ) Notice: Subject to any disclaimer, the term of this patent is extended or adjusted under 35 U.S.C. 154(b) by 0 days.

(21) Appl. No.: 17/501,328

(22) Filed: Oct. 14, 2021

(65) Prior Publication Data

US 2022/0116713 A1 Apr. 14, 2022

(30) Foreign Application Priority Data

Oct. 14, 2020 (IT) ........................ 102020000024175

(51) Int. Cl.
*H04R 9/06* (2006.01)

(52) U.S. Cl.
CPC ...................................... *H04R 9/06* (2013.01)

(58) Field of Classification Search
CPC ........ H04R 3/04; H04R 29/001; H04R 3/007; H04R 3/08; H04R 2499/11; H04R 29/003; G10L 21/038
See application file for complete search history.

(56) References Cited

U.S. PATENT DOCUMENTS

2003/0142832 A1* 7/2003 Meerkoetter ........ H04R 29/003 381/59
2015/0249889 A1* 9/2015 Iyer .......................... H04R 3/08 381/98

(Continued)

OTHER PUBLICATIONS

ISR for International Application PCT/IB2021/059442 dated Jan. 18, 2022.

(Continued)

*Primary Examiner* — Carolyn R Edwards
*Assistant Examiner* — Julie X Dang
(74) *Attorney, Agent, or Firm* — LADAS & PARRY LLP

(57) ABSTRACT

A method for controlling a loudspeaker having an electromechanical force transducer and a diaphragm by:

Providing a non-linear electromechanical model configured to apply one or more desired conditions to a loudspeaker input digital audio signal, i.e. to an analogic input signal converted in a digital input signal;

Providing an inverse non-linear electromechanical model of the transducer configured to receive a signal processed by the non-linear model and to linearize at least one mechanical and/or electrical and/or electromechanical non-linearity of the transducer;

Converting the digital output signal of the electromechanical model into an analog signal for the transducer, So that the output signal comprises an input voltage signal for the transducer and at least the second non-linear model is a digital wave filter (hereinafter referred to as Wave Digital Filters, WDF) to provide a directly computable function in the discrete-time domain to get the input voltage signal for the transducer.

13 Claims, 6 Drawing Sheets

(56) References Cited

U.S. PATENT DOCUMENTS

| | | | | |
|---|---|---|---|---|
| 2015/0382100 | A1* | 12/2015 | Azmi | H04R 1/1016<br>381/380 |
| 2017/0318390 | A1* | 11/2017 | Bjork | H04R 3/04 |

OTHER PUBLICATIONS

Written Opinion for International Application PCT/IB2021/059442 dated Jan. 18, 2022.
Dietrich Franken, et al.: Passive Parametric Modeling of Dynamic Loudspeakers: IEEE Transactions on Speech and Audio Processing: vol. 9: No. 8: Nov. 1, 2001: pp. 885-891.
Dietrich Franken, et al.: "Observer-Based Feedback Linearization of Dynamic Loudspeakers with AC Amplifiers": vol. 13: No. 2: Mar. 1, 2005: pp. 233-242.
Wolfgang Klippel: "Direct Feedback Linearization of Nonlinear Loudspeaker Systems": vol. 46: No. 6: Jun. 1, 1998: pp. 499-507.
Adrian Leuciuc: "The Realization of Inverse System for Circuits Containing Nullors with Applications in Chaos Synchronization": vol. 26: No. 1: Jan. 1, 1998: pp. 1-12.
Matti Karjalainen, et al.: "Special Digital Filters for Audio Reproduction": Conference: AES 32nd International Conference: DSP for Loudspeakers: Sep. 2007: AES, 60 East 42nd Street, Room 2520 New York: 10165-2520: Sep. 1, 2007.
Kurt James Werner, et al.: "Wave Digital Filter Modeling of Circuits with Operational Amplifiers": 2016 24th European Signal Processing Conference (EUSIPCO): Aug. 29, 2016: pp. 1033-1037.

* cited by examiner

METHOD FOR THE NON-LINEAR CONTROL OF AN INPUT SIGNAL FOR A LOUDSPEAKER

TECHNICAL FIELD

The present invention refers to a non-linear control method of an input signal for a loudspeaker based on numerical modeling of the transduction process.

BACKGROUND

A loudspeaker is a transducer, i.e. a device capable of converting a physical quantity at its input, e.g. a current or a voltage, in another output by altering some characteristics that identify it. In particular, an electrical signal is converted into sound waves and the physical transduction mechanism can be described by a non-linear modeling to describe, for example, a harmonic distortion and a modulation of the electrical input signal due to the excursion of the moving parts and to the coil current Non-linearities of the transduction process are alleviated or controlled through three different methods:

- feedback-based methods;
- methods based on functional representation;
- physical model-based methods of the transduction process.

The limit of the first family of methods lies in the need to use sensors to measure mechanical signals to be used in the feedback loop (typically acceleration or speed of the moving parts): the use of these sensors poses implementation problems due to the addition of a mass additional to the mobile unit and the need to compensate for the non-linearities introduced by the sensor itself.

The second family of methods is based on a representation of non-linear behavior using generic functional forms (Volterra, Hammerstein or Wiener systems) to estimate the variables of the system's state. The limit of this family of methods lies in the need to truncate the functional representation to limit the complexity of the estimation of the elements necessary to represent the terms above the second degree.

The third family of methods is based on a non-linear physical model of the transduction process. This representation allows to overcome the disadvantages of methods based on functional representation, at the cost of an increase in computational complexity.

Document 'Passive parametric modeling of dynamic loudspeakers', D. Franken et al., IEEE Transactions on speech and audio processing, NY vol. 9, no. 8, XP011054138 ISSN: 1063-6676 discloses a direct model of a loudspeaker without an wave digital filter inverse model. A direct model alone cannot linearize non-linearities such as inductance and/or the stiffness of the transducer and/or the force factor of the controlled generator used to simulate the coupling of the electric circuit model and the mechanical circuit model.

Document 'Observer-based feedback linearization of dynamic loudspeakers with AC amplifiers', D. Franken et al. IEEE Transactions on speech and audio processing, NY vol. 13, no. 2, XP055816411 ISSN: 1063-6676 DOI: 10.1109 TSA.2004.841043 discloses the generation of inverse mathematical models via a state observer but such approach does not produce a directly computable mathematical formula and the system of equations is solved by iterative algorithms.

The cited wave digital filters are applied to estimate parameters of a direct model in real time.

SCOPE AND SUMMARY OF THE INVENTION

The scope of the present invention is to at least partially solve the disadvantages mentioned above.

The purpose of the present invention is achieved through a method for controlling a loudspeaker having an electromechanical force transducer and a diaphragm comprising the steps of:

- Providing a non-linear electromechanical model configured to apply one or more desired conditions to a loudspeaker input digital audio signal, i.e. to an analogic input signal converted in a digital input signal;
- Providing an inverse non-linear electromechanical model of the transducer configured to receive a signal processed by the non-linear model and to linearize at least one mechanical and/or electrical and/or electromechanical non-linearity of the transducer;
- Converting the digital output signal of the electromechanical model into an analog signal for the transducer,
- wherein the output signal comprises an input voltage signal for the transducer and at least the second non-linear model is a digital wave filter (hereinafter referred to as Wave Digital Filters, WDF) to provide a directly computable function in the discrete-time domain to get the input voltage signal for the transducer.

The method of the present invention, belonging to the third family mentioned above, proposes a representation which reduces the computational complexity, e.g. avoiding iterative calculation algorithms of the state of the art, through WDFs, which are instead directly computable through e.g. a binary tree structure.

In addition, a new method of inversion of the model based on the use of a nullor applied to a 'direct' electromechanical model of the loudspeaker is also advantageously introduced. This solves the main limitations existing today for physical model-based methods of the transduction process:

- the need to iteratively solve the non-linear model of the inverse system to make it computationally implementable;
- the strong dependence on the adaptive technique used to estimate the parameters of the nonlinear model.

In particular, the non-linear model of the inverse system is obtained through the following steps:

- increase or amplify the model of the transduction process with a null, suitably connected so as not to modify the behavior of the model;
- derive the inverse equivalent model using a theorem known in the art [Leuciuc "The realization of inverse system for circuits containing nullors with applications in chaos synchronization", Int. J. Circ. Theor. Appl., 26, 1-12, 1998].

The first direct model is preferably characterized by a desired property in the transduction process, such as one between the desired frequency response and/or a desired excursion-dependent force factor and/or a desired excursion-dependent mechanical stiffness and/or a desired inductance dependent on the excursion of the force transducer.

In particular, the first model limits the peaks of an input signal in order to avoid damage to the transducer, for example due to excessive movement, or to emulate a loudspeaker having known acoustic and/or electrical and/or mechanical characteristics known and different from those of the loudspeaker receiving the signal or the like.

Preferably, the aforementioned non-linear electromechanical model includes speaker parameters belonging to an electrical domain, at least one resistance and one impedance of a transducer coil; and to a mechanical domain, at least one elastic parameter such as stiffness, a damping and a moving mass of the transducer, the electrical and mechanical domain being coupled through a first conversion factor which relates an electromagnetic force applied to said moving mass with a counter electromotive force generated in the coil by the movement of the mass.

In this way, it is possible to express important non-linearities, such as those of inductance, of the elastic parameter and of the electromechanical conversion factor.

According to a preferred embodiment, the electromechanical model comprises at least one parameter of an acoustic domain, at least one acoustic impedance, the acoustic domain being coupled to the electrical and mechanical domains via a second conversion factor which relates to acoustic pressure waves generated from the diaphragm with a force applied by the transducer to the diaphragm.

The inclusion of an acoustic domain in the electromechanical model allows to increase the accuracy of the model itself.

Preferably the aforesaid method described above is combined with an adaptation step over time of one or more parameters of the electromechanical model based on an amplified analog output signal of the electromechanical model by means of an estimator.

In this way, the model can take into account the evolution over time of the value of some parameters.

Further characteristics and advantages of the present invention are indicated in the following description and in the claims.

BRIEF DESCRIPTION OF THE DRAWINGS

FIGS. 1*a*, 1*b* show respective equivalent electric models of a loudspeaker, of which FIG. 1*a* shows a particular configuration of acoustic impedance which models the behavior of a closed volume, while FIG. 1*b* shows a generic configuration of acoustic impedance.

DETAILED DESCRIPTION OF THE INVENTION

Figure 1:
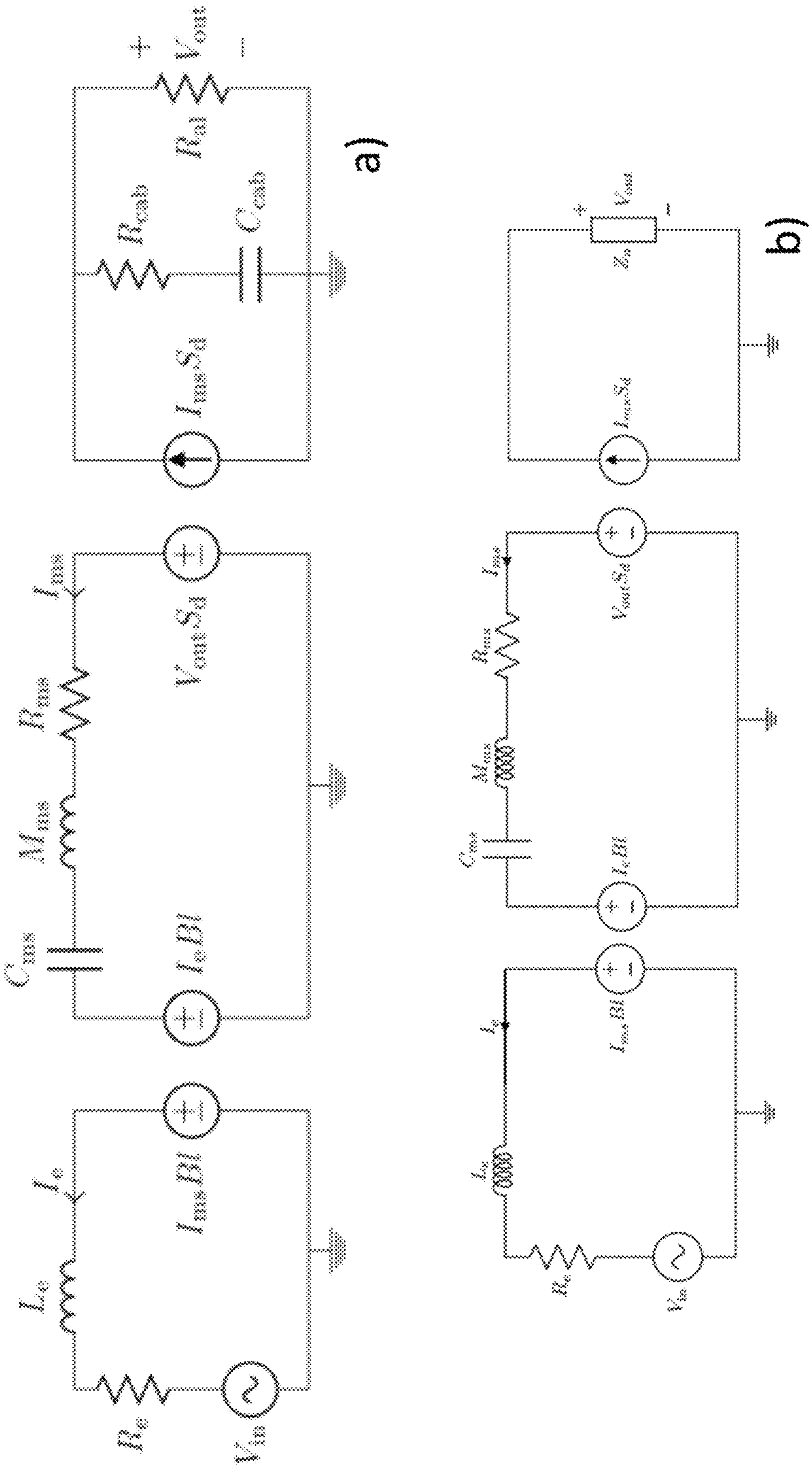

FIG. 1 shows the equivalent electrical model of a loudspeaker. Other more complex or more simplified representations are possible, e.g. in which parameters of the acoustic domain are not considered. The model includes three interdependent circuits which represent, from left to right, the electrical part, the mechanical part and the acoustic part of the transducer. This model accurately describes the behavior of the loudspeaker at frequencies lower than the first mode of vibrating of the diaphragm, that is, in the frequency band most affected by non-linear distortion phenomena.

The electrical part of the model includes the series of the following elements:

- a voltage generator representing the voltage signal $V_{in}$ at the loudspeaker input;
- a resistor with resistance $R_e$ representing the resistive part of the loudspeaker coil impedance;
- an inductor with inductance $L_e$ representing the purely inductive part of the loudspeaker coil impedance;
- a voltage generator controlled in current by the signal $I_{ms}$ weighed by the force factor Bl of the loudspeaker coil;

The mechanical part includes the series of the following elements:

- an inductor with inductance $M_{ms}$ representing the mass of all moving parts of the transducer (including the volume of air integral to the diaphragm);
- a resistor with $R_{ms}$ resistance representing the mechanical resistance of the system;
- a capacitor with capacity $C_{ms}=1/K_{ms}$ representing the mechanical compliance, inverse of the stiffness;
- a voltage generator controlled in current by the signal $I_e$ weighted by the force factor Bl;
- a voltage generator controlled in voltage by the signal $V_{out}$ weighed by the parameter Sd representing the effective surface of the radiator.

The acoustic part, specialized for modeling the behavior of a closed volume, includes the following elements:

- a capacitor with capacity $C_{cab}$ representing the compliance of the air contained in the closed volume;
- a resistor with resistance $R_{cab}$ representing the acoustic resistance;
- a resistor with resistance $R_{al}$ representing the air losses from the closed volume (to approximate the real behavior of a volume that is not perfectly sealed); according to a more general embodiment, the capacity and the two resistances indicated above can be modeled through an acoustic impedance;
- a current generator controlled in current by the signal $I_{ms}$ weighed by the parameter $S_d$.

The configuration of the acoustic part described here represents a loudspeaker in a closed box, variations to this configuration are known in the state of the art and easily derivable e.g. as expressed in FIG. 1*b* in which a model comprising a generic acoustic impedance is illustrated.

The solution of the present invention consists in a method for processing a digital audio signal to alter the acoustic signal produced by a loudspeaker allowing to reduce the non-linear distortion generated by the loudspeaker or by imposing on the loudspeaker the linear or non-linear behavior of another speaker model.

Furthermore, it is necessary to consider the composition of the model in a purely explanatory way as indicated in FIG. 1*a*, since it is possible to apply known techniques for the realization of equivalent circuits to group the same parameters and the topology of the connections in a different way from that illustrated, leaving unchanged the functional characteristics.

Figure 2:
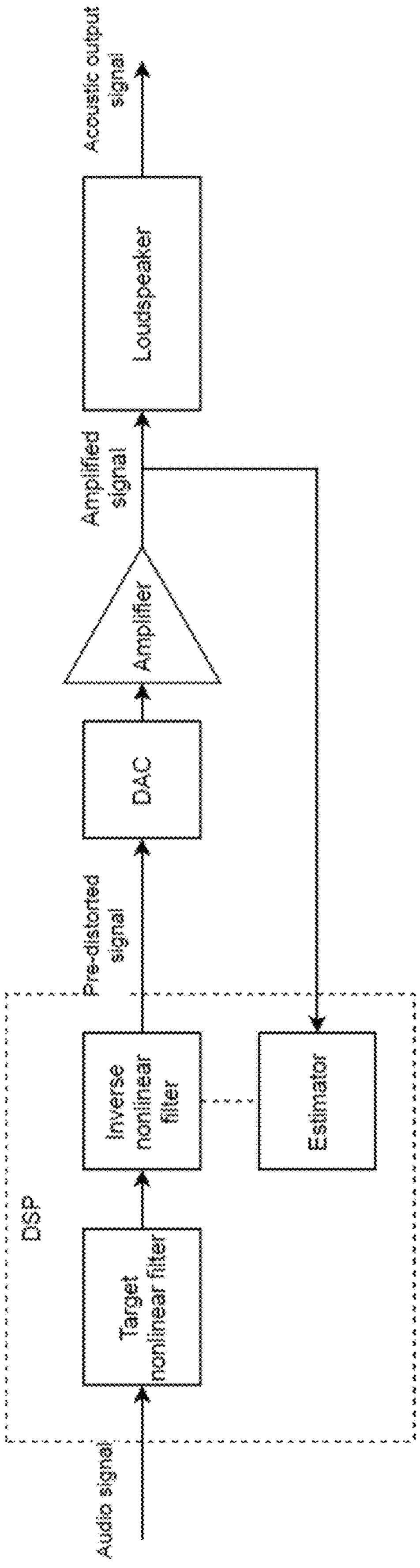
FIG. 2 shows the block diagram of the proposed system.

FIG. 2 shows the block diagram of the proposed solution consisting of a digital signal processor (Digital Signal Processor, DSP) configured to apply non-linear processing to the incoming audio signal, a digital-to-analog converter (digital-to-analog converter, DAC) configured to convert the digital output of the DSP into an analog signal, and an amplifier configured to amplify the analog signal to drive the loudspeaker.

The DSP receives and processes a digital audio signal by applying a first and a second non-linear mathematical model: for example, the processor can apply a first nonlinear digital filter to set a desired non-linear characteristic on the audio signal and, subsequently, to set another non-linear compensating feature, e.g. linearizes, the non-linear characteristic of the speaker through the second mathematical model. According to a preferred embodiment of the invention, the digital signal processor also includes an estimator that receives the amplified signal and estimates the constituent parameters of the non-linear digital filter that compensates for the non-linear characteristic of the loudspeaker. The presence of the estimator is optional, since the system can also operate using the nominal parameters of the loudspeaker.

The pre-distorted signal is converted into an analog signal using a digital-to-analog converter (DAC) and subsequently amplified by means of an amplifier. The amplified signal drives the loudspeaker to produce an acoustic output signal. The loudspeaker includes a dynamic direct radiation loudspeaker operating in a closed box. The amplified signal is also used as the estimator input. The DSP is made by means of a hardware (a processor) which executes a suitable software loaded on a memory that can be read by the processor to perform the digital signal processing operations described below.

First Mathematical Model: Non-Linear Target Filter (FT)

The target nonlinear digital filter receives the digital audio signal in input, applies the nonlinear filter based on the parametric model of the loudspeaker to the input signal to produce a filtered digital signal and finally outputs the pre-distorted signal with the desired non-linear characteristic, in order to be received and processed by downstream components. The non-linear target digital filter is implemented using a WDF system, described below. The non-linear target digital filter imposes on the audio signal a desired non-linear characteristic (target) which, for example, prevents overshooting of the transducer thus increasing its life time.

The WDF implementation is based on the local constitutive relationships of the single-port elements that constitute the loudspeaker model in the continuous-time domain, as shown in the following table, in which the nomenclature of the elements refers to FIG. 1*a*.

| $V_{in}$, $R_e$ | $v_4(t) = V_{in}(t) + R_e i_4(t)$ |
|---|---|
| $L_e$ | $v_5(t) = L_e \dfrac{di_5(t)}{dt}$ |
| $K_{ms}$ | $i_7(t) = \dfrac{1}{K_m s}\dfrac{dv_7(t)}{dt}$ |
| $M_{ms}$ | $v_8(t) = M_{ms}\dfrac{di_8(t)}{dt}$ |
| $R_{ms}$ | $v_9(t) = R_{ms} i_9(t)$ |
| $R_{cab}$ | $v_{11}(t) = R_{cab} i_{ii}(t)$ |

-continued

| $V_{in}$, $R_e$ | $v_4(t) = V_{in}(t) + R_e i_4(t)$ |
|---|---|
| $C_{cab}$ | $i_{12}(t) = C_{cab}\dfrac{dv_{12}(t)}{dt}$ |
| $R_{al}$ | $v_{15}(t) = R_{al} i_{15}(t)$ |

The dependent generators form two double-port elements. The first double-port element is an ideal rotator with a rotation ratio equal to Bl. In the continuous-time domain it is possible to write its constitutive relations $$V_{cm}(t)=I_{ms}(t)Bl, V_{me}(t)=I_e(t)Bl, \quad (1)$$

where Vcm(t) represents the counter-electromotive force in the electrical domain, and Vme(t) represents the force in the mechanical domain.

The second double-port element is an ideal transformer with a transformation ratio equal to Sd. In the continuous-time domain its constitutive relations are $$V_{ma}(t)=V_{out}(t)S_d, I_{am}(t)=I_{ms}(t)S_d, \quad (2)$$

where Vma(t) is the reaction force impressed by the acoustic load on the mechanical domain and Iam(t) is the volumetric velocity in the acoustic domain.

Figure 3:
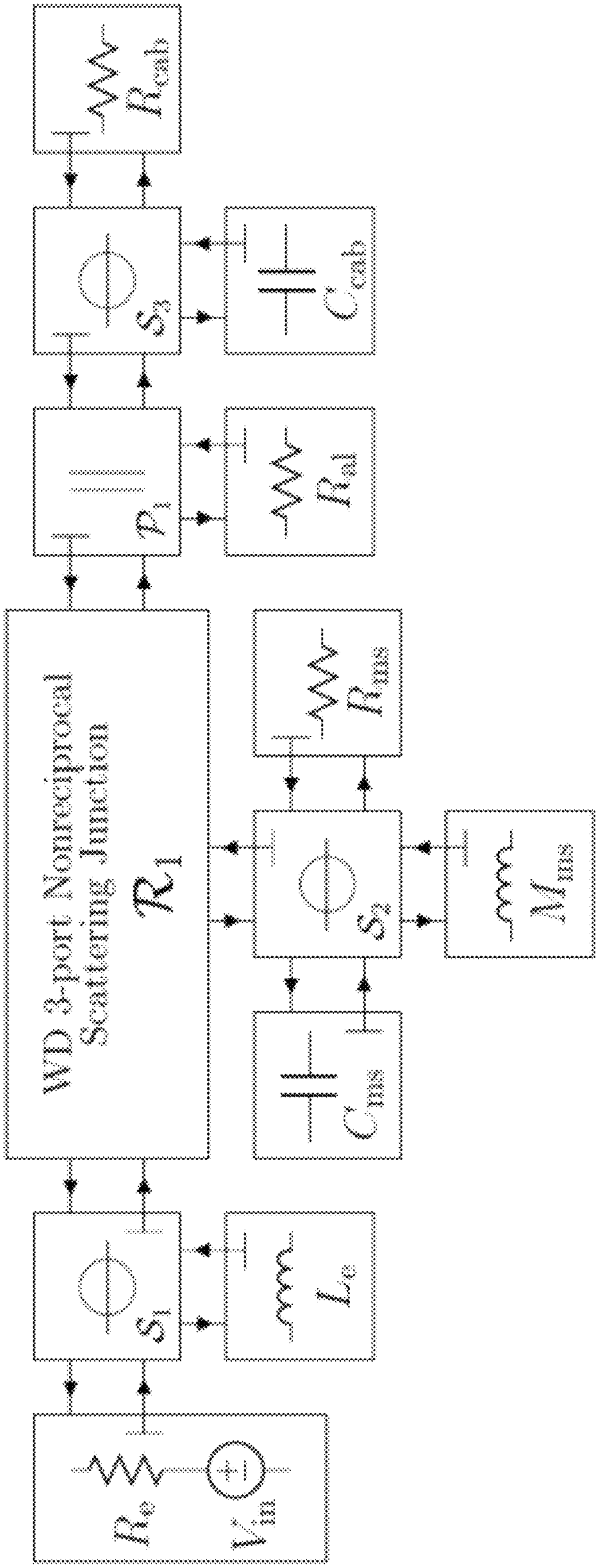
FIG. 3 shows the WDF implementation of the transducer model with the particular configuration of an acoustic impedance shown in FIG. 1*a*

The overall system to numerical wave is shown in FIG. 3. The implementation of systems WDF containing multiport elements in the solution described here consists in connecting the dependent generators to a 3-port junction, as shown in the binary connection tree in FIG. 4. The three ports of the junction are numbered 1, 2 and 3 and are characterized by three pairs of Kirchhoff variables {v1, j1}, {v2, j2}, {v3, j3}. The corresponding variables in the numerical wave domain are $$b_1=v_1+Z_1j_1, a_1=v_1-Z_1j_1, \quad (3)$$

$$b_2=v_2+Z_2j_2, a_2=v_2-Z_2j_2, \quad (4)$$

$$b_3=v_3+Z_3j_3, a_3=v_3-Z_3j_3, \quad (5)$$

where $b_1$, $b_2$ and $b_3$ are the incident waves and $a_1$, $a_2$, $a_3$ are the waves reflected by the junction. The scattering matrix of the junction is obtained with methods known in the state of the art, obtaining:

$$S_{\mathcal{R}_1} = \frac{1}{(Bl)^2 + Z_1Z_3S_d^2 + Z_1Z_2} \times \times \begin{bmatrix} (Bl)^2 - Z_1Z_3S_d^2 - Z_1Z_2 & -2(Bl)Z_1 & 2(Bl)S_dZ_1 \\ 2(Bl)Z_2 & (Bl)^2 + Z_1Z_3S_d^2 - Z_1Z_2 & 2S_dZ_1Z_2 \\ -2(Bl)S_dZ_3 & 2S_dZ_1Z_3 & (Bl)^2 + Z_1Z_2S_d^2 - Z_1Z_3S_d^2 \end{bmatrix}. \quad (6)$$

obtained, obtaining for junction $S_1$ $$S_{S_1} = \begin{bmatrix} \frac{Z_5}{Z_4+Z_5} & \frac{-Z_4}{Z_4+Z_5} & \frac{-Z_4}{Z_4+Z_5} \\ \frac{-Z_5}{Z_4+Z_5} & \frac{Z_4}{Z_4+Z_5} & \frac{-Z_5}{Z_4+Z_5} \\ -1 & -1 & 0 \end{bmatrix}. \quad (7)$$

The scattering matrix of the junction $S_3$ is $$S_{S_3} = \begin{bmatrix} \frac{Z_{12}}{Z_{11}+Z_{12}} & \frac{-Z_{11}}{Z_{11}+Z_{12}} & \frac{-Z_{11}}{Z_{11}+Z_{12}} \\ \frac{-Z_{12}}{Z_{11}+Z_{12}} & \frac{Z_{11}}{Z_{11}+Z_{12}} & \frac{-Z_{12}}{Z_{11}+Z_{12}} \\ -1 & -1 & 0 \end{bmatrix}. \quad (8)$$

The scattering matrix of the junction $S_2$ is $$S_{S_2} = \begin{bmatrix} \frac{Z_8+Z_9}{Z_7+Z_8+Z_9} & \frac{-Z_7}{Z_7+Z_8+Z_9} & \frac{-Z_7}{Z_7+Z_8+Z_9} & \frac{-Z_7}{Z_7+Z_8+Z_9} \\ \frac{-Z_8}{Z_7+Z_8+Z_9} & \frac{Z_7+Z_9}{Z_7+Z_8+Z_9} & \frac{-Z_8}{Z_7+Z_8+Z_9} & \frac{-Z_8}{Z_7+Z_8+Z_9} \\ \frac{-Z_9}{Z_7+Z_8+Z_9} & \frac{-Z_9}{Z_7+Z_8+Z_9} & \frac{Z_7+Z_8}{Z_7+Z_8+Z_9} & \frac{-Z_9}{Z_7+Z_8+Z_9} \\ -1 & -1 & -1 & 0 \end{bmatrix}. \tag{9}$$

The scattering matrix of the junction $\mathcal{P}_1$ is $$S_{\mathcal{P}_1} = \begin{bmatrix} \frac{-Z_{14}}{Z_{14}+Z_{15}} & \frac{Z_{14}}{Z_{14}+Z_{15}} & 1 \\ \frac{Z_{15}}{Z_{14}+Z_{14}} & \frac{-Z_{15}}{Z_{14}+Z_{15}} & 1 \\ \frac{Z_{15}}{Z_{14}+Z_{14}} & \frac{Z_{14}}{Z_{14}+Z_{14}} & 0 \end{bmatrix}. \tag{10}$$

Given the constitutive relationships shown above, the single-port elements of the loudspeaker model can be implemented as numerical wave elements as shown in the table below, where k denotes discrete time, Ts denotes sampling period and $F_s=T_s^{-1}$ indicates the sampling frequency.

| | Definitions | Scattering formulae |
|---|---|---|
| $V_{in}$, $R_e$ | $Z_4 = R_e$ | $b_4[k] = V_{in}[k]$ |
| $L_e$ | $Z_5 = L_eF_s$ | $b_5[k] = (b_5[k-1] - a_5[k-1])/2$ |
| $K_{ms}$ | $Z_7 = K_{ms}T_s$ | $b_7[k] = (b_7[k-1] + a_7[k-1])/2$ |
| $M_{ms}$ | $Z_8 = M_{ms}F_s$ | $b_8[k] = (b_8[k-1] - a_8[k-1])/2$ |
| $R_{ms}$ | $Z_9 = R_{ms}$ | $b_9[k] = 0$ |
| $R_{cab}$ | $Z_{11} = R_{cab}$ | $b_{11}[k] = 0$ |
| $C_{cab}$ | $Z_{12} = T_s/C_{cab}$ | $b_{12}[k] = (b_{12}[k-1] + a_{12}[k-1])/2$ |
| $B_{al}$ | $Z_{15} = R_{al}$ | $b_{15}[k] = 0$ |

While the following table shows the numerical wave implementation of the junctions, which uses the scattering matrices defined in Equations (6)-(10).

| | Definitions | Scattering formulae |
|---|---|---|
| $\mathcal{S}_1$ | $Z_6 = Z_4 + Z_5$, $b_6 = a_1$ | $[a_4, a_5, a_6]^T = S_{\mathcal{S}_1}\ [b_4, b_5, b_6]^T$ |
| $\mathcal{S}_2$ | $Z_{10} = Z_7 + Z_8 + Z_9$, $b_{10} = a_2$ | $[a_7, a_8, a_9, a_{10}]^T = S_{\mathcal{S}_2}\ [b_7, b_8, b_9, b_{10}]^T$ |
| $\mathcal{S}_3$ | $Z_{13} = Z_{11} + Z_{12}$, $b_{13} = a_{14}$ | $[a_{11}, a_{12}, a_{13}]^T = S_{\mathcal{S}_3}\ [b_{11}, b_{12}, b_{13}]^T$ |
| $\mathcal{P}_1$ | $Z_{14} = Z_{13}, Z_{16} = \frac{Z_{14}Z_{15}}{Z_{14}+Z_{15}}, b_{14} = a_{13}, b_{16} = a_3$ | $[a_{14}, a_{15}, a_{16}]^T = S_{\mathcal{P}_1}\ [b_{14}, b_{15}, b_{16}]^T$ |
| $\mathcal{R}_1$ | $Z_1 = Z_6$, $Z_2 = Z_{10}$, $Z_3 = Z_{16}$, $b_1 = a_6$, $b_2 = a_{10}$, $b_3 = a_{16}$ | $[a_1, a_2, a_3]^T = S_{\mathcal{R}_1}\ [b_1, b_2, b_3]^T$ |

Figure 4:
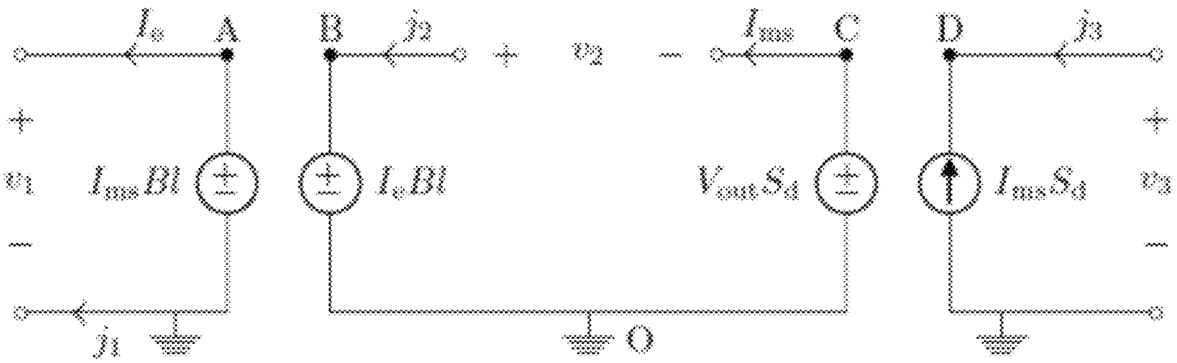
FIG. 4 shows a tri-port network implemented with a digital wave adapter of type.

The WDF implementation shown in FIG. 4 allows to implement a direct computational flow, i.e. a computational flow that does not use iterative solvers. The computational flow consists of three phases, which are repeated for each instant of discrete time k.

1) Direct scanning: from the leaves of the binary connection tree to the root. Along the computational path, the waves reflected by the linear elements are calculated by means of the scattering relations previously introduced; the waves are propagated through the junctions to the nonlinear elements.

2) Local nonlinear scattering at the root of the binary connection tree. Given the incident wave, calculated in phase 1, the reflected wave is calculated using the constitutive relationship of the nonlinear element.

3) Retrograde scan: from the root to the leaves of the binary connection tree. Along the computational path, the waves propagate through the junctions up to the linear elements; the waves incident to the linear elements are calculated using the scattering relations previously introduced.

Output Signals and Status Signals

The status and output signals are computed from the incident and reflected waves computed by the computational flow described above.

The input signal is represented by the variable $v_1$. In the discrete time domain, the signal analogous to the coil displacement can be estimated as $$\hat{x}[k]=\xi_x(T_sI_{ms}[k-1]+x[k-2]), \tag{11}$$

where $\xi_x \leq 1$ is oblivion, whose role is to dampen the truncation error of the integrator at each sample, so as not to accumulate. The signal $I_{ms}$ [k] is calculated as $$I_{ms}[k] = \frac{a_9[k] - b_9[k]}{2Z_9[k]}. \tag{12}$$

The output signal Vout[k] equivalent to the pressure produced by the transducer is estimated as $$\text{out}[k] = \frac{a_3[k] - b_3[k]}{2}. \tag{13}$$

Time-Varying Parameters

Some parameters of the speaker model are not time-invariant, but depend on the x(t) signal equivalent to the physical displacement of the coil in the transducer. In particular, the parameters Bl, $K_{ms}$ and $L_e$ are non-linear functions of the signal x(t). In the known art these functions are modeled as polynomials. This aspect is problematic since if the excursion x(t) exceeds the interval of $$b_5[k] = \xi_{L_e}(b_5[k-1] - a_5[k-1])\frac{L_e[k]}{2T_sZ_5[k-1]}, \tag{14}$$

$$Z_5[k] = L_e'[k]I_{ms}[k] + F_sL_e[k],$$

validity of the polynomial representation, extrapolation based on the polynomial model can lead to unrealistic evaluations of the parameters Bl, $K_{ms}$ and $L_e$. For this reason, in our solution we use functions that best approximate the nonlinear functions Bl(x), $K_{ms}$(x) and $L_e$(x) in the entire domain of the signal x(t). The function Bl(x) is modeled as a Gaussian type function, the $L_e$(x) function is modeled as a sigmoid type function, the $K_{ms}$(x) function is modeled as a linear combination of exponential functions. The non-linear force factor is updated with each sample by evaluating the function Bl(x) in $\hat{x}$[k]. In the case of non-linear and time-variant inductance $L_e$, the proposed numerical wave realization is where $L'_e$[k] represents the numerical derivative of $L_e$(x(t))

$$L_e'[k] = \frac{dL_e(x(t))}{dt}\bigg|_{t=kT_s} = \frac{L_{e\beta}L_{e\gamma}\exp - L_{e\gamma}(L_{e\alpha} + \hat{x}[k])}{(\exp(-L_{e\gamma}(L_{e\alpha} + \hat{x}[k])) + 1)^2}. \quad (15)$$

Considering the time-varying non-linear stiffness, the proposed numerical realization is $$b_7[k] = \xi_{K_{ms}} \frac{a_7[k-1] + b_7[k-1]}{2}, \quad (16)$$

$$Z_7[k] = K_{ms}[k]T_s\left(1 - \frac{1}{K'_{ms}[k]} \frac{a_7[k-1] + b_7[k-1]}{2}\right),$$

where $K'_{ms}[k]$ is the numerical derivative of $K_{ms}(x(t))$ $$K_{ms}'[k] = K_{ms\alpha}K_{ms\beta} \exp(K_{ms\beta}\hat{x}[k]) + K_{ms\gamma}K_{ms\lambda} \exp(K_{ms\lambda}\hat{x}[k]). \quad (17)$$

Second Mathematical Model: Inverse Nonlinear Filter (FI)

The inverse non-linear digital filter receives the output of the target non-linear digital filter at its input, applies the inverse non-linear filter based on the parametric model of the speaker to produce a filtered digital signal, and outputs the pre-distorted signal with the characteristic desired non-linear, compensating for the non-linear characteristic of the transducer, in order to be received and processed by the other components of the system. The inverse non-linear digital filter is implemented using a digital wave system, described below. The parameters of the inverse nonlinear digital filter are received by the estimator block, described later. Preferably, the structure of the model before the inversion is the same as that of the first model with the addition of a null, as explained in more detail below. Instead, the parameters of the second model are suitably different from those of the first model to adapt to the construction characteristics of the speaker e.g. of the transducer.

The proposed invention realizes the inverse system by manipulating the equivalent circuit of the speaker shown in FIG. 1. This manipulation, described below, allows you to create the inverse of any electrical circuit.

Figure 5:
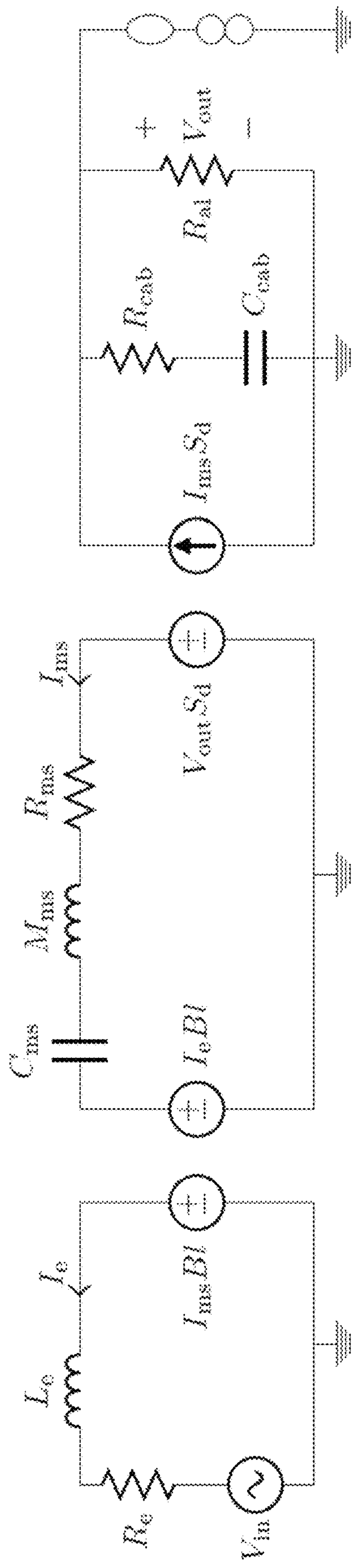
FIG. 5 shows the equivalent circuit of the augmented transduction process with a nullor.

The equivalent circuit of the transduction process, shown in FIG. 1*a*, can be manipulated by adding a theoretical circuit element, called nullor, to the ends of the resistor Ral to obtain the circuit depicted in FIG. 5. The nullor is defined as a two-gate theoretical circuit element, consisting of the series of a norator (shown with two continuous circles) and a nullor (shown with an ellipse). The nullator is a theoretical circuit element crossed by zero current and with zero voltage at its ends, while the norator is crossed by arbitrary current and has arbitrary voltage at its ends. The nullity, therefore, is characterized by the following constitutive relationship $$\begin{bmatrix} v_1 \\ i_1 \end{bmatrix} = \begin{bmatrix} 0 & 0 \\ 0 & 0 \end{bmatrix} \begin{bmatrix} v_2 \\ i_2 \end{bmatrix}.$$

Considering the properties of the nullor, it can be observed that the circuits of FIG. 1*a* and FIG. 5 are equivalent.

Figure 6:
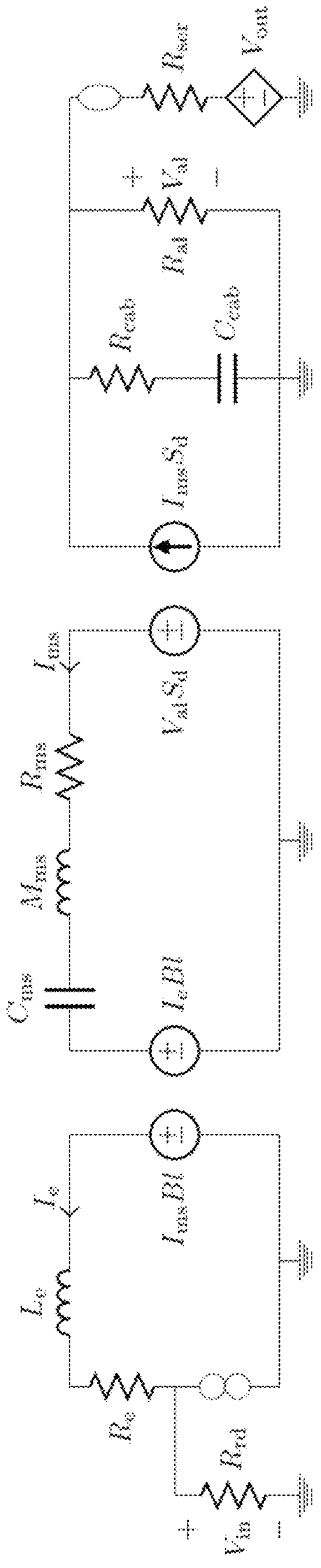
FIG. 6 shows the circuit equivalent to the reverse of the transduction process.

To obtain an inverse circuit that allows, with reference to FIG. 5, to calculate Vin as a function of Vout, the circuit of FIG. 5 is further manipulated by replacing the norator with a voltage-controlled voltage generator, and replacing the source generator with the norator, for obtain the circuit of FIG. 6. Furthermore, in the circuit of FIG. 6, a resistor is added in parallel to the norator and a resistor in series to the nullator; thanks to the circuit properties of the norator and nullator, it is observed that the addition of the resistors does not change the behavior of the circuit.

The circuits in FIG. 5 and FIG. 6 have the same topology, so they can be described by the same state function f(x, u, y) and by the same output function g(x, u, y), where x represents the state, u represents the input signal and y represents the output signal. By marking with a tilde the signals corresponding to the circuit of FIG. 6, and assuming that the circuits of FIG. 5 and FIG. 6 admit a single solution, then the output equation g(x, u, y)=0 which represents the circuit of FIG. 5 has unique solution y=h(x, u), and the output equation g (x_tilde, u_tilde, y)=0 which represents the circuit of FIG. 6 has unique solution u_tilde=h^(−1) (x_tilde, y), for each real-valued x and x_tilde state. It follows that if the initial states coincide, e.g. x (0)=x_tilde (0), then u=u_tilde, ie the circuit in FIG. 6 realizes the inverse of the circuit in FIG. 5.

This result is known in the literature. C.f.r. A. Leuciuc, "The realization of inverse system for circuits containing nullors with applications in chaos synchronization", Int. J. Circ. Theor. Appl., 26, 1-12 (1998).

Figure 7:
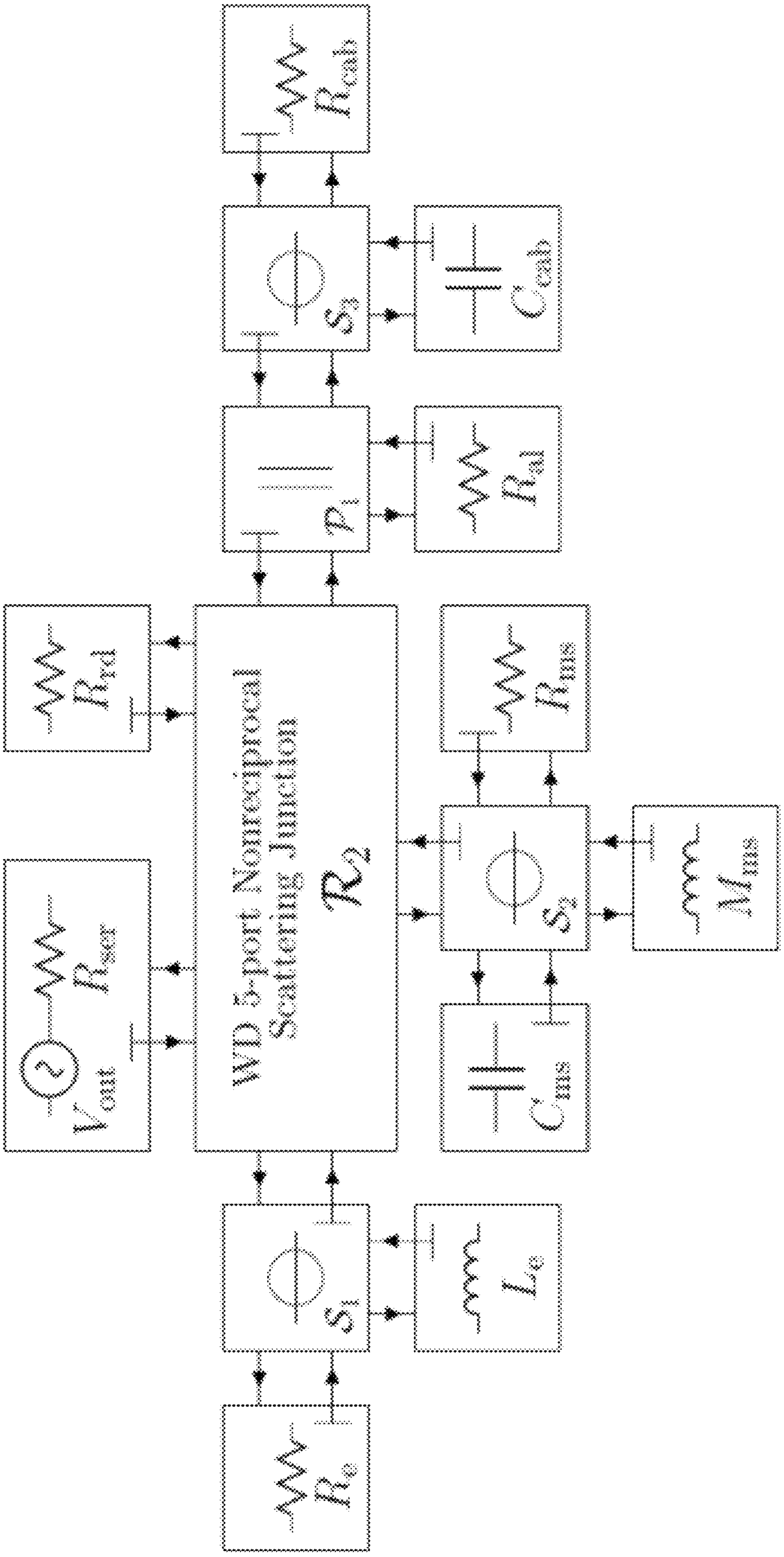
FIG. 7 shows the numerical wave embodiment of the inverse system.

FIG. 7 shows the WDF reaction of the inverse system via a binary connection tree. The single-gate elements of the inverse system are characterized by the same scattering relationships already described in the previous section, as well as the and junctions.

The scattering matrix of the junction, which in this case (considering the different topology) has five gates, is defined as $$S_{\mathcal{R}_2} = \begin{bmatrix} -1 & \frac{-2Z_5}{Bl} & -\frac{2((Bl)^2 + Z_2Z_5)}{(Bl)S_dZ_3} & \frac{2((Bl)^2 + Z_3Z_5S_d^2 + Z_2Z_5)}{BlS_dZ_3} & +2 \\ 0 & +1 & \frac{2Z_2}{S_dZ_3} & -\frac{2Z_2}{S_dZ_3} & 0 \\ 0 & -\frac{2Z_5}{Bl} & -\frac{2((Bl)^2 + Z_2Z_5)}{(Bl)S_dZ_3} & \frac{2((Bl)^2 + Z_3Z_5S_d^2 + Z_2Z_5)}{BlS_dZ_3} & +2 \\ 0 & 0 & -1 & +2 & 0 \\ 0 & 0 & 0 & +1 & 0 \\ 0 & -\frac{2Z_5}{Bl} & -\frac{2Z_2Z_5}{(bl)S_dZ_3} & \frac{2Z_5(Z_3S_d^2 + Z_2)}{BlS_dZ_3} & +1 \end{bmatrix}. \quad (18)$$

Output Signals and Status Signals

The status and output signals are computed from the incident and reflected waves computed by the computational flow described above.

The input signal is represented by the variable v3. The output signal Vout[k] equivalent to the transducer input voltage which cancels its non-linear behavior is Vout[k]=v1.

Estimator

It is known that the parameters that describe the behavior of the transducer are variable over time depending on the electrical energy entering the transducer. In particular, the parameters most sensitive to variations are the electrical resistance Re and the Kms value (x=0) which describes the stiffness at rest of the transducer suspensions. The estimator is responsible for inferring the variation of these two parameters as a function of time, using the voltage Ve(t) and the current Ie(t) in input to the transducer as input signals.

The estimation of Re(t) and Kms(x=0, t) is performed by the following algorithm.

1. Estimate of Re. We consider the estimate R^e and two perturbations of the estimate R^e±$\delta_R$. The non-linear target digital filter is used to predict the current entering the transducer. The three estimated currents are compared with the measured current. The resistance value that returns the smallest error between the measured current and the estimated current is selected.

2. Estimate of Kms(0). We consider the K^ms (0) estimate and two perturbations of the K^ms (0)±δK estimate. The non-linear target digital filter is used to predict the current entering the transducer. The three estimated currents are compared with the measured current. The stiffness value is selected which gives the smallest error between the measured current and the estimated current.

Remaining Parts of the System

The pre-distorted signal with the desired non-linear characteristic, compensating for the non-linear characteristic of the transducer and adapting the parameters Re and Kms (x=0) is converted into the analog domain by a digital/analog converter and then amplified with a audio amplifier. The amplified signal constitutes the transducer input that allows you to obtain the desired acoustic output. The amplified signal is also used as an input from the estimator.

Finally, it is clear that it is possible to make changes or variations to the method described and illustrated here without departing from the scope of protection as defined by the attached claims.

The invention claimed is:

1. A method of controlling a loudspeaker having an electromechanical force transducer and a diaphragm comprising the steps of:

providing a non-linear model (FT) configured to apply one or more desired conditions to a loudspeaker input digital audio signal;

providing an inverse non-linear electromechanical (FI) model of the force transducer configured to receive a signal processed by the non-linear model and to compensate, preferably linearize, at least one mechanical and/or electrical and/or electromechanical non-linearity of a transducer coil; and converting the digital output signal of the electromechanical model into an analog signal for the force transducer, wherein the output signal comprises a voltage signal representative of the displacement of the transducer to emit sounds by the action of the transducer on the diaphragm and at least said non-linear electromechanical inverse model is a digital wave filter (WDF) model to provide a directly computable function of the input signal for the transducer and, the aforementioned non-linear electromechanical model includes parameters of the speaker belonging to an electrical domain, and to a mechanical domain, the electrical and mechanical domain being coupled through a first conversion factor based on a first current-controlled voltage generator and a second current-controlled voltage generator to relate an electromagnetic force applied to said moving mass with a counter-electromotive force generated in the coil by the movement of the mass.

2. Method according to claim 1, wherein said inverse model is obtained starting from a direct electromechanical model comprising a nullor.

3. Method according to claim 1, wherein the desired condition is at least one of the desired frequency response conditions and/or a force factor dependent on the desired excursion and/or a mechanical stiffness dependent on the desired excursion and/or an inductance depending on the desired excursion of the force transducer.

4. Method according to claim 1, wherein the electromechanical model comprises at least one parameter of an acoustic domain, the acoustic domain being coupled to the electrical and mechanical domains via a second conversion factor which relates acoustic waves of pressure generated by the diaphragm with a force applied by the transducer to the diaphragm.

5. Method according to claim 4, wherein the second conversion factor is based on a voltage-controlled voltage generator and a current-controlled current generator.

6. A method of controlling a loudspeaker having an electromechanical force transducer and a diaphragm comprising the steps of:

providing a non-linear model (FT) configured to apply one or more desired conditions to a loudspeaker input digital audio signal;

providing an inverse non-linear electromechanical (FI) model of the force transducer configured to receive a signal processed by the non-linear model and to compensate, preferably linearize, at least one mechanical and/or electrical and/or electromechanical non-linearity of a transducer coil;

converting the digital output signal of the electromechanical model into an analog signal for the force transduce wherein said inverse model is obtained starting from a direct electromechanical model comprising a nullor and wherein the output signal comprises a voltage signal representative of the displacement of the transducer to emit sounds by the action of the transducer on the diaphragm and at least said non-linear electromechanical inverse model is a digital wave filter (WDF) model to provide a directly computable function of the input signal for the transducer and, wherein the aforementioned non-linear electromechanical model includes parameters of the speaker belonging to an electrical domain, and to a mechanical domain, the electrical and mechanical domain being coupled through a first conversion factor based on a first current-controlled voltage generator and a second current-controlled voltage generator to relate an electromagnetic force applied to said moving mass with a counter-electromotive force generated in the coil by the movement of the mass.

7. A method of controlling a loudspeaker having an electromechanical force transducer and a diaphragm comprising the steps of:

providing a non-linear model (FT) configured to apply one or more desired conditions to a loudspeaker input digital audio signal;

providing an inverse non-linear electromechanical (FI) model of the force transducer configured to receive a signal processed by the non-linear model and to compensate, preferably linearize, at least one mechanical and/or electrical and/or electromechanical non-linearity of a transducer coil; and converting the digital output signal of the electromechanical model into an analog signal for the force transducer, wherein the desired condition is at least one of the desired frequency response conditions and/or a force factor dependent on the desired excursion and/or a mechanical stiffness dependent on the desired excursion and/or an inductance depending on the desired excursion of the force transducer;

wherein the output signal comprises a voltage signal representative of the displacement of the transducer to emit sounds by the action of the transducer on the diaphragm and at least said non-linear electromechanical inverse model is a digital wave filter (WDF) model to provide a directly computable function of the input signal for the transducer and wherein the aforementioned non-linear electromechanical model includes parameters of the speaker belonging to an electrical domain, and to a mechanical domain, the electrical and mechanical domain being coupled through a first conversion factor based on a first current-controlled voltage generator and a second current-controlled voltage generator to relate an electromagnetic force applied to said moving mass with a counter-electromotive force generated in the coil by the movement of the mass.

8. Method according to claim 6, wherein the electromechanical model comprises at least one parameter of an acoustic domain, the acoustic domain being coupled to the electrical and mechanical domains via a second conversion factor which relates acoustic waves of pressure generated by the diaphragm with a force applied by the transducer to the diaphragm.

9. Method according to claim 7, wherein the electromechanical model comprises at least one parameter of an acoustic domain, the acoustic domain being coupled to the electrical and mechanical domains via a second conversion factor which relates acoustic waves of pressure generated by the diaphragm with a force applied by the transducer to the diaphragm.

10. Method according to claim 8, wherein the second conversion factor is based on a voltage-controlled voltage generator and a current-controlled current generator.

11. Method according to claim 9, wherein the second conversion factor is based on a voltage-controlled voltage generator and a current-controlled current generator.

12. A method of controlling a loudspeaker having an electromechanical force transducer and a diaphragm comprising the steps of:

providing a non-linear model (FT) configured to apply one or more desired conditions to a loudspeaker input digital audio signal;

providing an inverse non-linear electromechanical (FI) model of the force transducer configured to receive a signal processed by the non-linear model and to compensate, preferably linearize, at least one mechanical and/or electrical and/or electromechanical non-linearity of a transducer coil; and converting the digital output signal of the electromechanical model into an analog signal for the force transducer, wherein the output signal comprises a voltage signal representative of the displacement of the transducer to emit sounds by the action of the transducer on the diaphragm and at least said non-linear electromechanical inverse model is a digital wave filter (WDF) model to provide a directly computable function of the input signal for the transducer and wherein said inverse model is provided by a wave digital five-port nonreciprocal scattering junction, said junction having:

A first port connected to a first series adaptor connecting a wave digital model of a resistor and a wave digital model of an inductor;

A second port connected to a second series adaptor connecting a wave digital model of a capacitor, a wave digital model of an inductor and a wave digital model of a resistor;

A third port connected to a first parallel adaptor connecting a wave digital model of a resistor and a series adaptor connecting a wave digital model of a capacitor and a wave digital model of a resistor;

A fourth port connected to a wave digital model of a resistor;

A fifth port connected to a wave digital model of a resistive voltage source.

13. Electronic control unit for a loudspeaker having an electromechanical force transducer and a diaphragm programmed for:

running a non-linear model (FT) configured to apply one or more desired conditions to a speaker input digital audio signal;

performing a non-linear electromechanical (FI) inverse model of the force transducer configured to receive a signal processed by the non-linear model and to linearize at least one mechanical and/or electrical and/or electromechanical non-linearity of a transducer coil; and converting the digital output signal of the electromechanical model into an analog signal for the force transducer, wherein the output signal comprises a voltage signal representative of the displacement of the transducer to emit sounds by the action of the transducer on the diaphragm and at least the inverse non-linear electromechanical model is a digital wave filter (WDF) model to provide a directly computable function of the input signal for the transducer;

wherein said inverse model is provided by a wave digital five-port nonreciprocal scattering junction, said junction having:

A first port connected to a first series adaptor connecting a wave digital model of a resistor and a wave digital model of an inductor;

A second port connected to a second series adaptor connecting a wave digital model of a capacitor, a wave digital model of an inductor and a wave digital model of a resistor;

A third port connected to a first parallel adaptor connecting a wave digital model of a resistor and a series adaptor connecting a wave digital model of a capacitor and a wave digital model of a resistor;

A fourth port connected to a wave digital model of a resistor;

A fifth port connected to a wave digital model of a resistive voltage source.

* * * * *